(12) United States Patent
Eltgen et al.

(10) Patent No.: US 6,953,215 B2
(45) Date of Patent: Oct. 11, 2005

(54) COMPONENT FOR MOUNTING IN A BODY PART

(75) Inventors: Horst Eltgen, Bergisch Gladbach (DE); Michael Meyer, Pulheim (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 569 days.

(21) Appl. No.: 10/267,281

(22) Filed: Oct. 9, 2002

(65) Prior Publication Data

US 2004/0080171 A1    Apr. 29, 2004

(51) Int. Cl.[7] ................................. B06J 7/00
(52) U.S. Cl. ..................... 296/1.07; 293/117
(58) Field of Search ............. 296/1.07; 293/117; 362/505, 506

(56) References Cited

U.S. PATENT DOCUMENTS 4,722,032 A    1/1988   Kulka
5,060,122 A  * 10/1991  Miyoshi ............... 362/505

FOREIGN PATENT DOCUMENTS

| DE | 195 44 623 | 5/1997 |
| GB | 2 088 543 | 9/1982 |
| GB | 2 154 723 | 11/1985 |

* cited by examiner

*Primary Examiner*—Joseph D. Pape
(74) *Attorney, Agent, or Firm*—Brinks Hofer Gilson & Lione

(57) ABSTRACT

The invention concerns a component such as a lamp for fitting into a recess in a part of a body. The lamp is fixed in its reference position in the recess by a pivot projection engaging into an opening in the body, and by a V-shaped resilient detent element. The detent element has a first limb projecting inclinedly at an angle from the rear wall of the component. The first limb has a holding projection which in the reference position of the component engages behind an opening in the body. The free end of the second limb of the detent element carries dismantling projections which when the component is further pressed into the recess latch behind catches on the component to fix the detent element in a configuration in which the holding projection is released from its latching engagement with the body.

4 Claims, 1 Drawing Sheet

COMPONENT FOR MOUNTING IN A BODY PART

FIELD OF THE INVENTION

The invention concerns a component which is designed for mounting in a recess in a part of the body for example of a motor vehicle. By way of example the component may be a lamp which is to be integrated into a bumper of the vehicle.

BACKGROUND OF THE INVENTION

For the purposes of fixing a component such as more particularly a lamp in a recess in a part of a body, it is possible to use a fixing means which engages with the body in two stages each with differing actions. Such an arrangement can be found in DE 30 44 313 A1. In that case the component firstly has a pivot pin which engages into a first opening in the part of the body and thereby fixes the component pivotably at that point. Also arranged on the component is a V-shaped resilient detent element, the V-shape comprising two limbs of which one limb is connected to the component and projects substantially perpendicularly from the rear wall of the component and therefore points precisely in the direction in which the component is fitted into the recess. Provided on the other limb of the detent element is a holding projection which latches into a second opening in the part of the body when the component is disposed in its appropriate position in the recess in the part of the body. That implements the first step in latching engagement of the detent element, thereby providing that the component is held and fixed to the part of the body of the motor vehicle.

In addition, provided at the free end of the detent element is a dismantling projection which latches into a catch on the component when the component is pressed beyond its reference or target position in the body further into the recess. By virtue of the component being further pressed into the recess, the V-shaped detent element is compressed, whereby the dismantling projection moves on to the catch on the component and finally comes into latching engagement behind the catch. That second stage in latching engagement of the detent element provides that the detent element is fixed in its compressed configuration. In this respect it is important that, in the compressed configuration, the holding projection is no longer in engagement with the second opening in the part of the body, so that at that location the fixing of the component to the part of the body is released. The component can therefore be removed from the recess again.

The above-discussed arrangement thus permits easy fitment of the component by inserting it and pressing it into the recess until the holding projection comes into latching engagement on the part of the body. It also permits easy removal by further pressing the component into the recess until the dismantling projection latches into the catch on the component and thereby fixes the detent element in a configuration in which latching engagement on the part of the body is removed. A disadvantage with that arrangement however is that it requires a large amount of space at the rear of the component as sufficient space must be available there for the V-shaped detent element to pass thereinto when the component is pressed into the recess.

SUMMARY OF THE INVENTION

An object of the present invention is to provide a component, such as in particular a lamp, which is designed for mounting in the recess in a part of a body and which more particularly is suitable for fixing in a recess when there is only little space available at the bottom of the recess.

Another object of the invention is to provide a component such as a motor vehicle lamp suitable for being fitted in a recess or opening in a part of a vehicle body, which permits easy mounting therein and equally disengagement therefrom without requiring the use of specialist tools and without involving the need for a complicated and possibly bulky structure in the body of the vehicle to allow fitment of the component.

In accordance with the invention the foregoing and other objects are attained by a component which is designed for mounting in the recess in a part of a body of a motor vehicle, for example a lamp in a bumper, including a pivot projection which is designed for engagement into a first opening in the part of the body in order to fix the component at at least one point while in that case simultaneously permitting pivotal movement of the component about said point. A V-shaped resilient detent element comprises first and second limbs defining its V-shape and is mounted with the end of its first limb to the body of the component, the limb which is connected to the component being disposed inclinedly with respect to the direction in which the component is pressed into the recess at the rear wall of the component. The detent element includes on the first limb a holding projection which is latchable into a second opening in the part of the body when the component is in the required reference position within the recess. In that way the component is held and fixed in the recess for the intended use by the latching engagement of the holding projection. At least one dismantling projection is provided on the other limb at the free end of the detent element and is latchable into at least one corresponding catch arranged on the component when the component is pushed beyond the above-mentioned reference position into the recess. In that latched position of the dismantling projection with the catch the V-shape of the detent element is fixed in a compressed configuration in which the holding projection is released from its engagement into the part of the body, so that the component is releasable therefrom.

Unlike the situation with the above-discussed previous arrangement therefore the holding projection is not arranged at the free limb of the detent element, at the end of which the dismantling projection is disposed, but rather it is on the first limb which is connected to the component. Furthermore another difference is that the first limb of the detent element according to the invention is mounted to the rear wall of the component not in parallel but in inclined relationship with respect to the direction in which the component is pressed in. Typically the angle between the direction in which the component is pressed in and that limb is between about 20° and 80°, particularly preferably between about 30° and 55°.

The above-indicated alterations can provide that the assembly arrangement, in the space behind the rear wall of the component, manages with a very small amount of space. More specifically, the inclined attachment of the detent element to the body of the component provides that the detent element can move closer to the rear wall of the component when the latter is being pushed in so that, in spite of an inward movement of the component, relative to the part of the body, the detent element is not involved in a corresponding inward movement. Accordingly, there also does not have to be any space for such an inward movement of the detent element. In contrast, in the case of the prior detent elements which project from the back wall of the component in parallel relationship with the direction in which it is pushed in, such a movement of the detent element towards the component is not possible.

As the holding projection is provided on the first limb connected to the component, that further contributes to achieving the desired approach movement. This ensures that, when the component is being pressed in, a force is directly applied to the first limb connected to the component, wherein such force presses the entire detent element against the component in the described manner.

In accordance with a development of the invention the detent element is of such a shape that the dismantling projection bears against a wall of the part of the body when the component is in its reference position in the recess. In that case, that wall of the part of the body preferably has a third opening therein, into which the catch arranged on the component can penetrate when the component is being pressed into the recess, until it latches behind the dismantling projection. The fact of the dismantling projection bearing against the wall of the part of the body contributes to the detent element, when the component is being pressed in, not penetrating or penetrating only immaterially deeper into the space behind the component. At the same time the dismantling projection is held fast by virtue of the dismantling projection bearing against the wall of the part of the body when the catch of the component approaches and finally latches behind the dismantling projection. The fact that the dismantling projection is held fast during the latching engagement of the catch therefore ensures a well-defined and reproducible latching characteristic. The third opening in the wall of the part of the body ensures in that respect that there is sufficient space for the catch to pass through. That third opening can also be in the form of a depression, Preferably provided on the detent element are first and second dismantling projections which can come into latching engagement with the catch simultaneously and symmetrically. In that case the dismantling projections can be formed in particular by a cut-out extending in the longitudinal direction of the detent element so that the end of the detent element is of a U-shaped configuration, wherein a respective limb of the U-shape forms a respective dismantling projection.

Further objects, feature and advantages of the invention will apparent from the description hereinafter of a preferred embodiment.

DESCRIPTION OF THE PREFERRED EMBODIMENT

Figure 1:
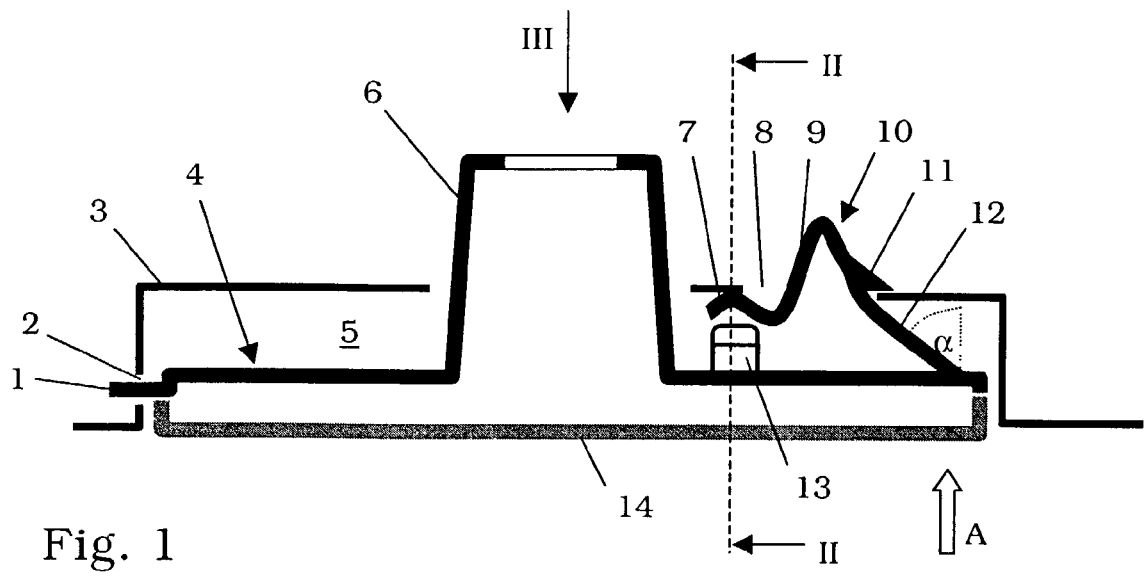
FIG. 1 shows a component in the form of a lamp fitted into the recess in a part of a body, in its reference or target position.

Referring to the drawings, viewed therein as an example of a component which can be fitted with the latching connection according to the invention is a lamp 4 which is fitted into a recess 5 in a body part in the form of a bumper 3 of a motor vehicle.

Figure 2:
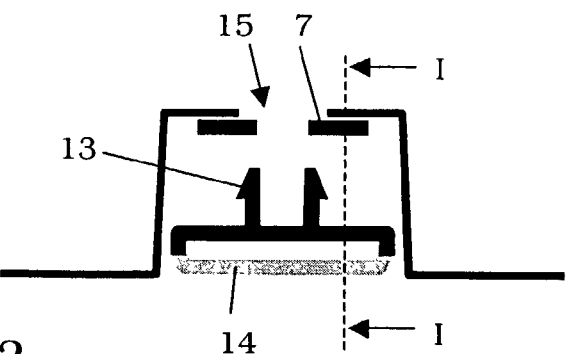
FIG. 2 is a view in section taken along line II—II in FIG. 1.

As can be seen from FIGS. 1 and 2, the lamp comprises a front transparent cover 14 which can be produced in particular from PMMA, and a main body having a rear wall 6 which can preferably comprise ABS/PC or PC. The bumper 3 of which only a portion is indicated preferably also comprises plastic material.

FIG. 1 is a view in cross-section taken along line I—I in FIG. 2 showing the lamp 4 in its finished fitted reference or target position within the recess 5. In this arrangement the lamp 4 is fixed at two points, more specifically on the one hand by the engagement of a pivot projection or pin 1 provided at the left-hand edge of the lamp in the Figure, into a corresponding first opening 2 in the part 3 of the body, and on the other hand by the latching engagement of a holding projection 11 behind the edge of a second opening 8 in the part 3 of the body.

In this arrangement the holding projection 11 is provided on a first limb 12 of a substantially V-shaped detent element 10. The detent element 10 is attached with that limb 12 to the rear wall 6 of the lamp at an angle of about 45° relative to the direction of insertion as indicated at A of the lamp 4.

Two dismantling projections 7 are provided at least adjacent to the free end of the other free limb 9 of the detent element 10. As can be clearly seen from FIGS. 2 and 3 the dismantling projections 7 are formed by a cut-out in the end of the detent element 10. The cut-out imparts a configuration which is U-shaped in plan, to the end of the detent element 10.

To fit the lamp 4 in the recess 5 firstly the pivot projection 1 has to be inserted into the opening 2 in the part 3 of the body. Then the lamp 4 is introduced into the recess 5 in the direction of insertion illustrated by the arrow A, in which case the holding projection 11 passes through the opening 8 and finally engages latchingly behind an edge portion thereof. At the same time the dismantling projections 7 come to bear against the inside of the bottom of the recess 5. The lamp 4 is thus fixed in its reference or target position.

If the lamp 4 is to be removed from the recess 5 for example for maintenance, repair or replacement, it is firstly pressed deeper into the recess 5 by the application of a pressure in the direction of the arrow A. When that happens it pivots about the fixing formed from the pivot projection 1 and the first opening 2. While the lamp 4 is caused to move further into the recess 5, the detent element 10 cannot move therewith but is held fast by the bottom of the recess 5 so that it cannot penetrate deeper into the recess 5 or into the space behind the recess. Therefore, there is also no need to provide space for such movement of the detent element. As the detent element 10 is not also involved in the inward movement of the lamp 4, the spacing between the freely movable portions 9, 12 of the detent element 10 and the rear wall 6 of the lamp necessarily decreases. In that respect, the possibility of such an approach movement of the detent element 10 towards the rear wall of the lamp is ensured not least by the inclined connection, at the angle, of the first limb 12 of the detent element 10 to the rear wall 6 of the lamp.

Figure 3:
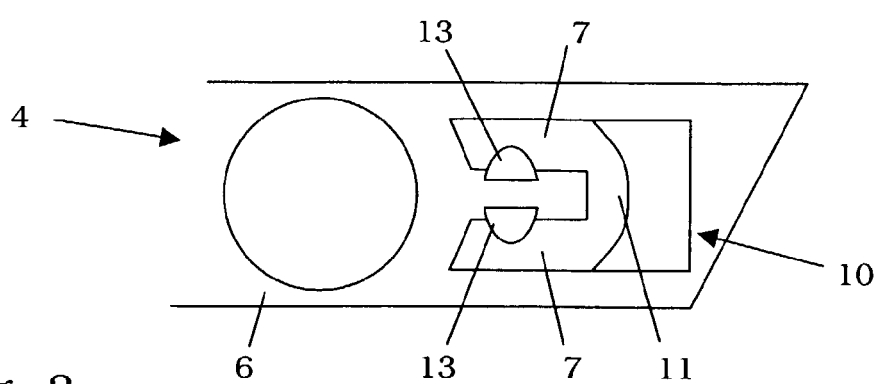
FIG. 3 is a plan view of the lamp in the direction of the arrow III in FIG. 1, wherein the detent element is compressed by latching engagement of the dismantling projections.

When the lamp 4 has been sufficiently deeply pressed into the recess 5 two hook-shaped catches 13 which are provided on the rear wall 6 of the lamp come to lie behind the dismantling projections 7 of the detent element. As can be seen in particular from FIG. 2 in that case the catches 13 can pass through a third opening 15 in the part 5 of the body. The third opening 15 can be connected to the second opening 8. The third opening 15 can alternatively be in the form of a recess. The plan view of the lamp 4, without the part 3 of the body, in FIG. 3 shows the catches 13 after they have passed through the opening 15 and after latching engagement with the dismantling projections 7.

After the latching engagement of the dismantling projections 7 has taken place the detent element 10 is fixed in a compressed configuration in which the inclined limb 12 is inclined further towards the left in FIG. 1. Consequently, as the holding projection 11 is provided on the limb 12 of the detent element 10, which is connected to the rear wall 6 of the lamp, the holding projection 11 moves towards the left in FIG. 1 and out of its detent state in the opening 8 when the lamp 4 is pressed into the recess 5. In particular it is no longer in that detent state when the detent element 10 is fixed in the compressed configuration by latching engagement of the catches 13 behind the dismantling projections 7. The lamp 4 can therefore be readily removed again from the recess, in that condition.

So that the lamp 4 can later be fitted again into the recess and fixed therein, it is only necessary to release the latching engagement of the catches 13 with the dismantling projections 7 again so that the detent element 10 can again assume its non-compressed shape.

Therefore a lamp of the configuration described permits particularly easy fitting to and removal from the recess in a part of a body, wherein only a small amount of space is required for an inward pressing movement thereof at the bottom of the recess.

It will be appreciated that the embodiment of the invention as set forth hereinbefore has been described solely by way of illustration and example and that various alterations and modification may be made therein without thereby departing from the spirit and scope of the invention.

What is claimed is:

1. A component which is designed for mounting in the recess in a part of a body of a vehicle including
   a main body having a rear wall,
   a pivot projection on the main body for engagement into a first opening in the part of the body,
   a resilient detent element comprising first and second limbs in a V-shape, the first limb being connected to the rear wall of the main body of the component inclinedly with respect to the direction in which the component is pressed into the recess,
   a holding projection on the first limb of the detent element and latchable into a second opening in the part of the body when the component is in its reference position within the recess,
   at least one catch on the main body, and
   at least one dismantling projection at the second limb and latchable with said at least one catch when the component is pushed beyond its said reference position into the recess, whereby in the latched position of the dismantling projection the holding projection is released from its engagement into the second opening in the part of the body.

2. A component as set forth in claim 1 wherein the dismantling projection in the reference position of the component bears against a wall of the part of the body.

3. A component as set forth in claim 2 wherein said wall includes a third opening to permit the catch to pass through to a position behind the dismantling projection when the component is pressed into the recess.

4. A component as set forth in claim 1 wherein the free end of the second limb of the detent element has a cut-out dividing it into two mutually opposite dismantling projections.

* * * * *